Dec. 19, 1967  J. R. HALL  3,358,540
VINYL WALL COVERING CUTTER
Filed Feb. 23, 1966  2 Sheets-Sheet 1

INVENTOR
JOHN R. HALL
BY
Atty.

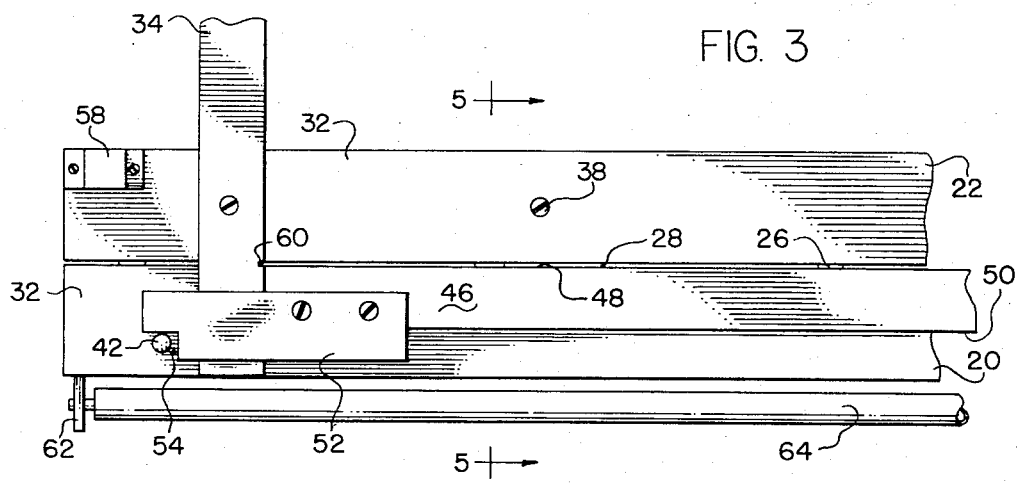
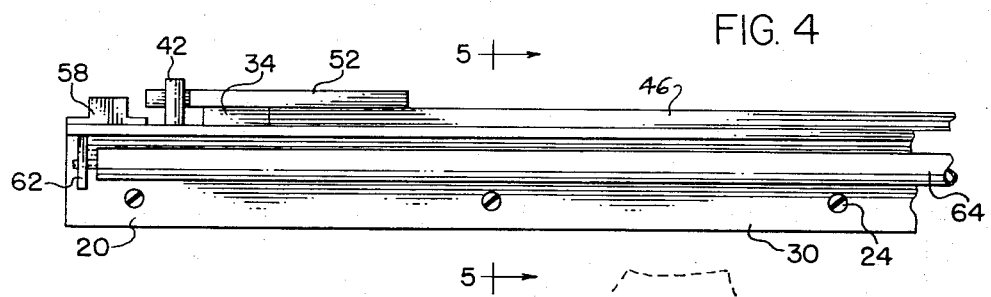
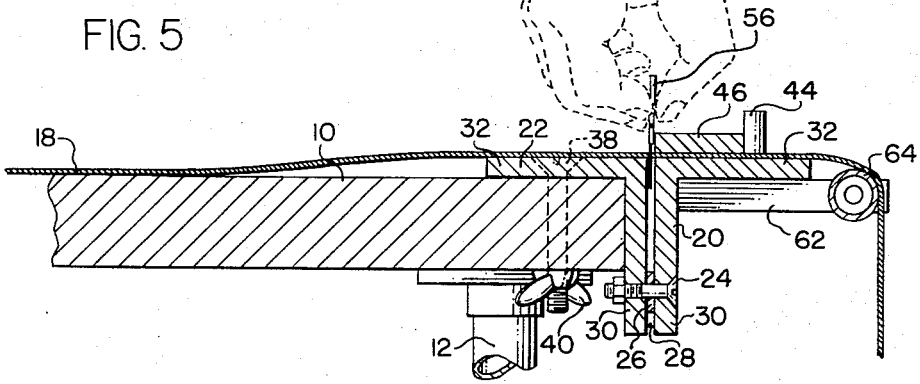

United States Patent Office

3,358,540
Patented Dec. 19, 1967

3,358,540
VINYL WALL COVERING CUTTER
John R. Hall, 607 Ave. L, Lubbock, Tex. 79401
Filed Feb. 23, 1966, Ser. No. 529,299
7 Claims. (Cl. 83—455)

This invention relates to wall covering and, more particularly, to cutting vinyl wall covering.

For many years the traditional wall covering was wallpaper which was severed by tearing against a straightedge. This was quite satisfactory for wallpaper inasmuch as it was not extremely expensive and was readily tearable in such an operation.

In recent years much of the covering to be applied to walls is a vinyl wall covering which has a woven fabric backing and a synthetic vinyl surface. This wall covering is widely known, commercially available, and has gained tremendous public acceptance and use in recent years.

The methods used for paper are not adaptable for the new vinyl wall coverings. These new vinyl wall coverings are tough and will not tear. Furthermore, they are more expensive and it is necessary to measure them more accurately because of their cost. It is further necessary that extreme care be taken that they are square across the cut.

At the present time, the vinyl wall covering is cut by placing a soft metal cutting strip onto the paste table, spreading out the desired length of vinyl wall covering over it, measuring off the correct length, marking the wall covering square, lining up the straightedge over the vinyl covering, and cutting the vinyl with a blade held against the straightedge cutting against the soft metal cutting strip.

This invention provides a cutter which includes a slotted member attached to the table with a guide along the edge of the table. Then the vinyl is rolled over the slotted member the correct length to a mark on the paste table. It is squared against a bar guide extending along the long edge of the table; then a straightedge strip is placed against pegs so that the straightedge is aligned with the slot and the vinyl cut with a blade which is guided by the straightedge and inserted into the slots.

An object of this invention is to provide an improved guide member for cutting vinyl wall covering.

Other objects are to achieve the above with a device that is sturdy, compact, durable, simple, safe, and reliable, yet inexpensive, quick and easy to manufacture, install on a table, and operate.

The specific nature of the invention, as well as other objects, uses, and advantages thereof, will clearly appear from the following description and from the accompanying drawing, the different views of which are not necessarily to the same scale, in which:

FIG. 3 is a partial plan view of the cutting device.

FIG. 4 is a partial elevational view of the cutting device.

FIG. 5 is a sectional view of the cutting device on a table shown in operation, taken substantially on line 5—5 of FIGS. 3 and 4.

Figures 1, 2:
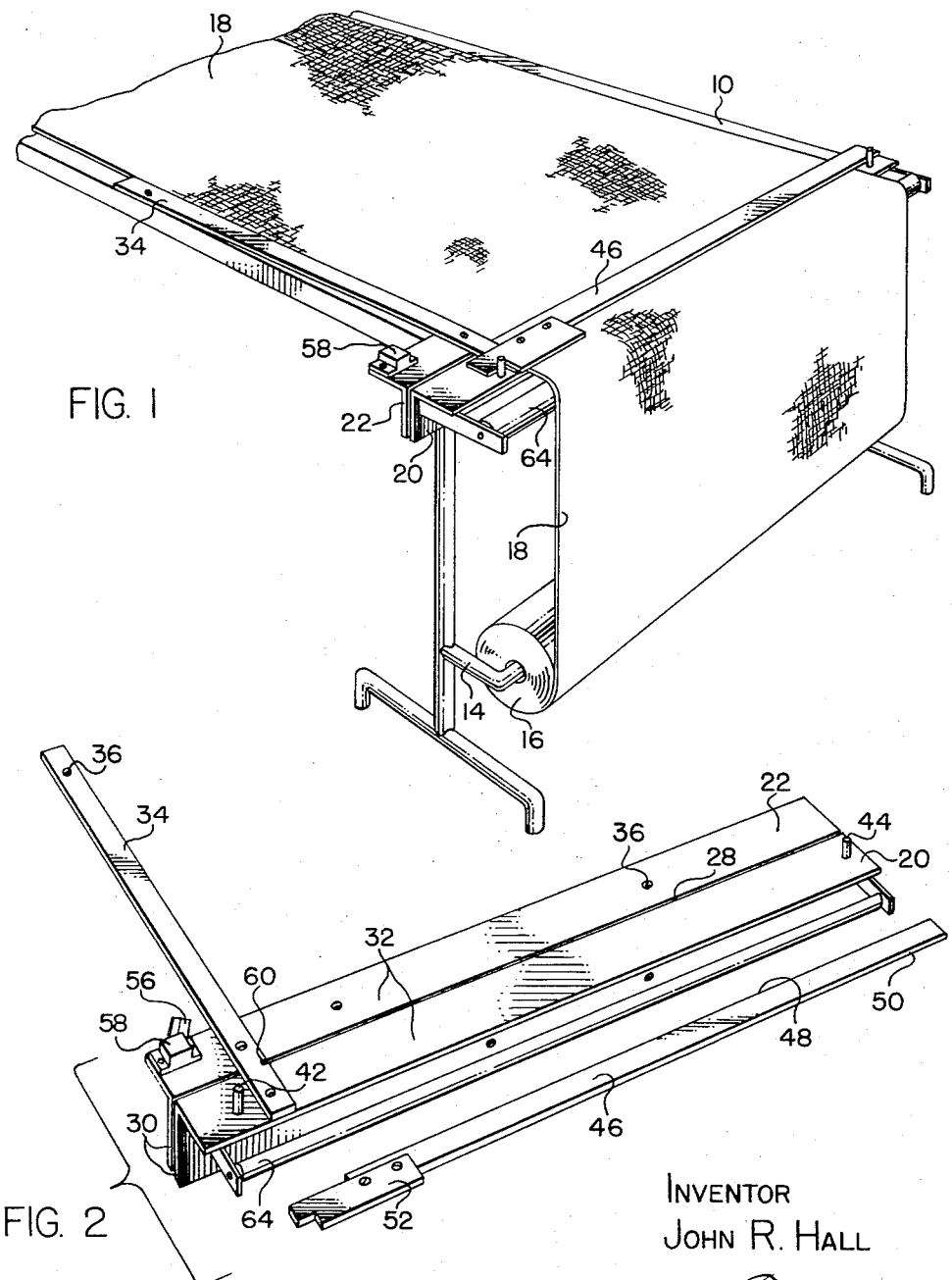
FIG. 1 is a perspective view of one embodiment of the invention attached to a paste table, the paste table broken away.
FIG. 2 is a perspective view of the cutter device itself removed from the table.

Referring more particularly to the drawing, it may be seen illustrated a paste table having table surface 10 supported by a plurality of legs 12. A holder 14 is attached to the legs for holding roll 16 of the vinyl sheet material 18.

My invention is adapted to attach to the table. Two angled members 20 and 22 are bolted together by a plurality of bolts 24. Washers 26, between the two angled members and around the bolts 24, space the angled members apart—thus forming a notch or slot 28 between the angled members. It will be seen that the angled members are attached together with the bolt 24 through lower legs 30 of the angles which are parallel with the slot between the lower legs. The upper legs 32 are coplanar and are parallel with the table surface 10.

Guide bars 34 is attached as by screws to one end of the lower member made up of the angled members 20 and 22. The bar is attached to the upper legs 32 above the upper legs and at right angles to the lower member and, therefore, also at right angles to the slot 28 therebetween the two angled members. Holes 36 through the angled member 22 and guide bar 34 provide for screws 38 to extend through these holes 36 so that the device may be attached to the table surface 10. Wing or thumb nuts 40 on the bottom of the screws securely attach the device to the top of the table. The guide bar 34 extends along one long edge of the table 10.

Peg 42, in the form of a hex nut, is attached near one end of the upper leg 32 of angled member 20. It is attached outboard of the guide bar 34 which is also near one end. Another peg 44, also in the form of a hex nut, is attached near the other end of the upper leg 32 of the angled member 20. Both pegs extend upward from the upper surface of the lower member, which includes the two angled members 20 and 22.

Straightedge strip 46 has a straightedge 48 and another back edge 50. A portion of the back edge 50 is formed by scab 52 which is attached to one end of the straightedge strip and which bridges the guide bar 34 when in use. One end of the straightedge strip 46 abuts against an edge of the guide bar 34. A portion of the back edge 50 of the scab is within the notch 54. In use, the straightedge strip 46 is abutted with its back edge 50 against the two pegs 42 and 44, the peg 42 within the notch 54. In this position, the straightedge 48 is aligned with the slot 28 so that, when blade 56 in the form of a razor blade is guided along the straightedge 48, it inserts within the slot 28—going entirely through the fabric 18 to make a clean cut. It will be noted that, since the blade goes all the way through the fabric, there is no doubt that the vinyl sheet is completely severed. Furthermore, different portions of the blade are in use, relieving the necessity of frequent sharpening which is contrary to the situation where the blade cuts against a metal strip beneath it, as was the customary practice before my invention. When not in use, the blade is conveniently held on magnetic holder 58 which is attached to the upper surface of the upper leg 32 of angled member 22. Also, it will be noted that there is a small notch 60 in the guide bar 34 which is also aligned with the slot 28 so that the blade may be inserted at that point so that the material is cleanly cut from one end to the other.

Bracket 62 is attached to the underside of the upper legs 32 on each end of the angled member 20. Roller 64 is journaled through a hole in each bracket 62. The roller is parallel to the end of the table and, therefore, is also parallel to the slot 28, the roll holder 14, and the roll 16. The roller 64 is outboard the lower member, i.e., it is at the very edge of the end of the table. It provides a guide to guide the vinyl upward so that it is not caught and damaged upon sharp corners.

It will be apparent that the embodiment shown is only exemplary and that various modifications can be made in operation, construction, materials, and arrangement within the scope of the invention as defined in the appended claims.

I claim as my invention:
1. In a paste table for vinyl wall covering having
   (a) a flat table surface, and

(b) legs supporting the table surface,
(c) the improvement comprising in combination with the above:
(d) a lower member attached along one end of the table,
(e) a slot in the lower member along the end of the table, extending substantially the width of the table,
(f) a pair of pegs on the lower member, and
(g) a straightedge strip with the straightedge aligned with said slot and the other edge abutting said pegs,
(h) so that a blade may be extended into said slot and guided by said straightedge to cut the vinyl.

2. The invention as defined in claim 1 with the addition of
(j) a guide bar extending along a long edge of the table attached at right angles to the lower member.

3. The invention as defined in claim 2 with the addition of
(k) a roll holder on the legs for holding a roll of vinyl material, and
(m) a roller attached parallel to the lower member to guide the viny from the roll holder to the table surface.

4. The invention as defined in claim 3 wherein
(n) the lower member is composed of two angled members,
(o) bolted together with a space therebetween to form said slot,
(p) said guide bar is attached on top the angles, and
(q) said straightedge strip has a scab on one end to bridge the guide bar,
(r) one of said pegs being on one end of the lower member outboard the guide bar and the other peg being on the other end of the lower member.

5. The invention as defined in claim 4 with the addition of
(s) a magnetic holder on the lower member for a razor blade.

6. The invention as defined in claim 5 wherein
(t) said lower member is attached to the table by screws extending through the lower member and table surface.

7. A vinyl wall covering cutter guide adapted to be attached to one end of a paste table comprising:
(a) two angled members bolted together with a space between to form a slot,
(b) a guide bar attached at right angles over the angled members near one end the angled members,
(c) a peg extending upward from the angled members near one end thereof,
(d) another peg extending upward from the angled members near the other end thereof,
(e) a straightedge strip on top the angled members with
(f) its straightedge aligned with the slot,
(g) the other edge abutting one peg and
(h) a scab attached to the straightedge strip
(j) bridging the guide bar, and
(k) abutting the other peg.

References Cited
UNITED STATES PATENTS

| | | | |
|---|---|---|---|
| 1,344,169 | 6/1920 | Buckingham | 83—455 |
| 1,480,168 | 1/1924 | Lambert | 83—614 X |
| 2,393,384 | 1/1946 | Kress | 83—614 |

ANDREW R. JUHASZ, *Primary Examiner.*